Aug. 13, 1968    J. H. AUER, JR    3,397,306
APPARATUS FOR UPDATING RUNNING AVERAGE
OF MEASURED TRAFFIC PARAMETER
Filed Dec. 1, 1964
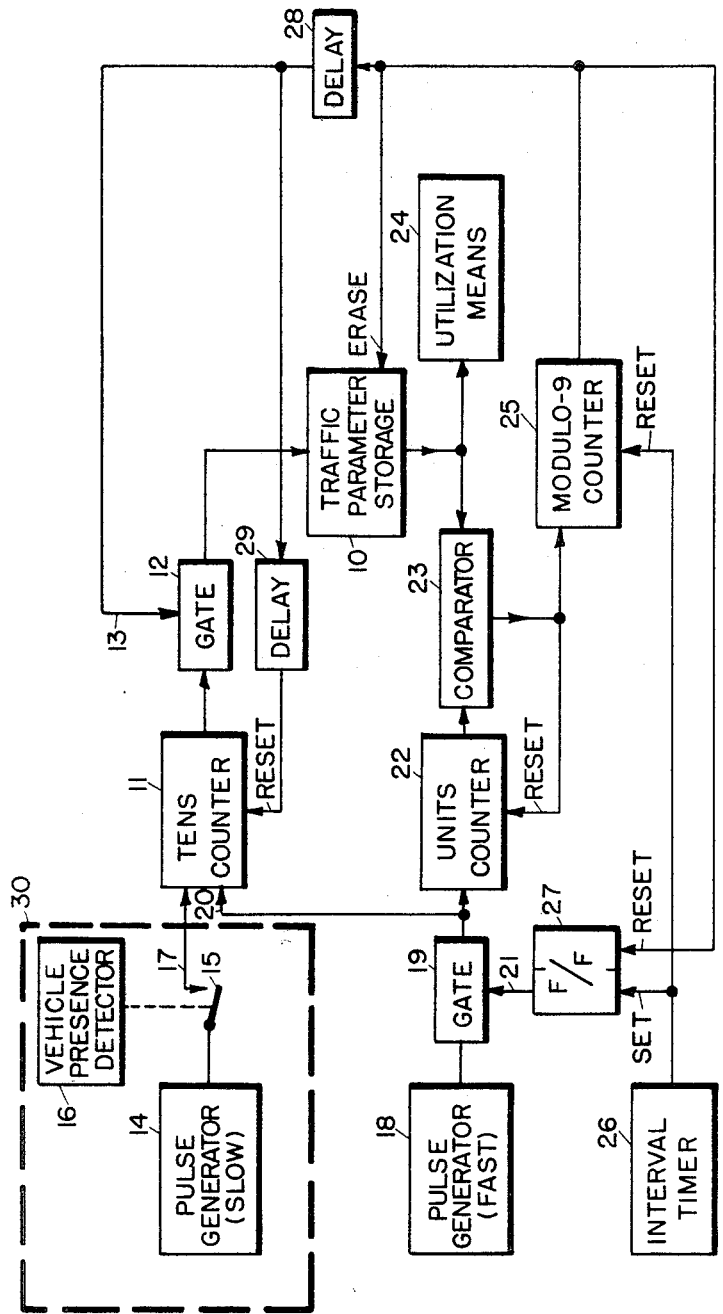
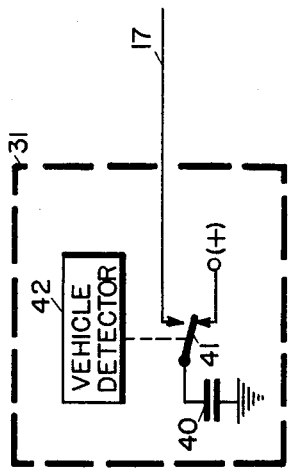
INVENTOR.
J. H. AUER JR.
BY
Forest D. Hitchcock
HIS ATTORNEY United States Patent Office 3,397,306
Patented Aug. 13, 1968

3,397,306
APPARATUS FOR UPDATING RUNNING AVERAGE OF MEASURED TRAFFIC PARAMETER
John H. Auer, Jr., Fairport, N.Y., assignor to General Signal Corporation, Rochester, N.Y., a corporation of New York
Filed Dec. 1, 1964, Ser. No. 415,108
8 Claims. (Cl. 235—150.24)

ABSTRACT OF THE DISCLOSURE

A system for maintaining a running average traffic parameter per time interval for a predetermined number of time intervals in a digital storage wherein a vehicle presence detector means generates a number of input pulses for an accumulator, the number of pulses accumulated being the number of input pulses divided by the number of time intervals for which the average is maintained. Once during each interval, additional input pulses are supplied to the accumulator in an amount corresponding to the digital storage at that time multiplied by one less than the number of time intervals for which the running average is provided. After the accumulator has been thus corrected, the digital value in the storage means is updated by gating means connecting its input to the output of the accumulator.

---

This invention relates to apparatus for obtaining traffic congestion data, and more particularly to apparatus for measuring vehicular traffic parameters on a periodically updated basis.

The traffic parameter which is of perhaps greatest value in providing an accurate measurement of traffic congestion is that of lane occupancy. This parameter represents the percentage of pavement occupied by vehicles at any given time and, unlike the parameters of speed, density and volume, takes into account the particular nature of the traffic stream. Hence, for the same number of vehicles per unit distance of highway, lane occupancy may assume different values depending upon the average length of vehicles constituting the traffic stream. This parameter may readily be derived from a vehicle presence detector, such as that described in H. C. Kendall et al. Patent No. 3,042,899, issued July 3, 1962.

In J. H. Auer, Jr. application Ser. No. 244,171, filed Dec. 12, 1962, which has issued as Patent No. 3,315,065, granted Apr. 18, 1967, there is shown a system for providing a digital representation of traffic lane occupancy. In J. H. Auer, Jr. application Ser. No. 389,588, filed Aug. 24, 1964, there is disclosed apparatus for measuring lane occupancy through use of digital techniques, and also apparatus for maintaining a continuous running average of lane occupancy.

The traffic parameter of volume, which represents the number of vehicles in a traffic stream passing a fixed location per unit of time, is useful in measuring free-flowing traffic. This parameter may easily be derived from practically any type of vehicle detector simply by producing a single output pulse each time a vehicle is sensed by the detector and counting the number of pulses produced per unit of time.

The present invention comprises apparatus for periodically updating a representation of average value of a traffic parameter such as lane occupancy or volume to ensure that this average value is kept current. To accomplish this, periodic measurements of the desired traffic parameter are taken. Each time a new representation of average value of the desired parameter is supplied to storage, it is first adjusted to reflect, to a predetermined degree, the effect of the newly-measured value upon the previous average value. In this fashion, the value of the traffic parameter retained in storage is altered only at periodic intervals. At all times other than at each instant of alteration, a fixed representation of updated average value of the desired parameter is held in storage.

Accordingly, one object of this invention is to provide a method and apparatus for maintaining a weighted running average of lane occupancy measurements.

Another object is to provide a method and apparatus for maintaining a weighted running average of volume measurements.

Another object is to provide means for periodically updating a parameter representing a weighted average of previously-measured lane occupancy with a parameter representing presently-measured lane occupancy.

Another object is to provide means for periodically updating a parameter representing a weighted average of previously-measured volume with a parameter representing presently-measured volume.

Another object is to provide means for computing a weighted average of lane occupancy measured at predetermined intervals wherein the weight each measurement bears in the average varies in a substantially inverse relationship with age of said measurement.

Another object is to provide means for computing a weighted average of volume measured at predetermined intervals wherein the weight each measurement bears in the average varies in a substantially inverse relationship with the age of said measurement.

In a typical embodiment, the invention contemplates vehicle presence detector means, accumulator means responsive to said vehicle presence detector means for temporarily storing a digital indication of presently-measured lane occupancy, storage means for storing a digital indication of average lane occupancy, means coupling the output of said accumulator means to the input of said storage means, and multiplier means responsive to said storage means for additively supplying a multiple of the indication in said storage means to the input of said accumulator means.

The foregoing and other objects and advantages of the invention will become apparent from the following detailed description when read in conjunction with the accompanying drawings in which:

FIG. 1 is a block diagram of the system as utilized for providing an updated average of lane occupancy.

FIG. 2 illustrates a modification of a portion of the system of FIG. 1 which enables the system to provide an updated average of traffic volume measurement.

Referring now to FIG. 1, there is shown a traffic parameter storage means 10. This storage means, which stores lane occupancy data in this embodiment, preferably comprises any one of many well-known digital data storage means capable of parallel read-in and parallel read-out. Input to storage means 10 is supplied from an accumulator means designated tens counter 11 through a gate 12 which is opened when its gating input lead 13 is energized. This accumulator means which counts groups of ten pulses each, may comprise a plurality of decade counters connected in series to count units, tens, hundreds, thousands, etc., with outputs supplied from each of the decade counters in the series string except the first. However, for greater accuracy, the units decade counter may be connected to the tens decade counter so as to increase the count in the tens decade counter by one whenever the units decade counter registers a count of 5, rather than 10. In either case, tens counter 11 functions substantially as a divide-by-ten circuit.

A first input to tens counter 11 is supplied from a lane occupancy generating circuit 30. This circuit produces output pulses from a pulse generator 14 through a front contact 15 controlled by a vehicle presence detector 16.

Thus, when front contact 15 is closed, pulse generator 14 supplies input pulses to a first input lead 17 of tens counter 11. In addition, pulses are also supplied from a pulse generator 18 to a second input lead 20 of tens counter 11 through a gate 19 whenever gating lead 21 of gate 19 is energized. Pulses furnished to both input leads 17 and 20 of tens counter 11 are additively counted by the tens counter. It should be noted that the pulse repetition rate of pulse generator 18 is preferably many times the pulse repetition rate of pulse generator 14.

Pulses produced by pulse generator 18 are also supplied to a units counter 22 whenever gate 19 is open. Outputs from both storage means 10 and units counter 22 are supplied to a comparator 23. In addition, the count stored in storage means 10 is supplied to utilization means 24, which may be an indicator system, a traffic signal control system, a computer, etc.

Output of comparator 23 is supplied to the input of a modulo-9 counter 25, and in addition is utilized for resetting units counter 22 each time the count in units counter 22 is sensed by the comparator as being equal to the count stored in storage means 10.

Modulo-9 counter 25 is periodically reset by an interval timer 26. Simultaneously, a flip-flop circuit 27 is periodically driven into the set condition by interval timer 26, thereupon energizing gating lead 21 of gate 19.

Output from modulo-9 counter 25 simultaneously resets flip-flop circuit 27 and erases the data in storage means 10. In addition, the output signal of modulo-9 counter 25 is supplied through a delay circuit 28 to gating input lead 13 of gate 12, permitting the count in tens counter 11 to be transferred to storage means 10. The signal produced by delay circuit 28 also provides a reset signal for tens counter 11 through an additional delay circuit 29.

In operation, each time a vehicle is detected by vehicle presence detector 16, front contact 15 is closed. During each of these detection intervals, pulses produced by pulse generator 14 are additively counted by tens counter 11. Assume that throughout this period of operation no output signal has been produced by timer 26, allowing flip-flop circuit 27 to remain in the reset condition, maintaining gate 19 closed. In addition, gate 12 is closed due to previous completion of an output pulse from modulo-9 counter 25, and an average of previously-measured lane occupancies is stored in storage means 10.

Assume now that timer 26 demarcates the end of a timing interval and produces an output pulse. At this instant, the count in tens counter 11 is proportional to lane occupancy measured only during the interval. That this is so may be determined by reference to the aforementioned J. H. Auer, Jr. application Ser. No. 244,171. The timer output pulse sets flip-flop circuit 27 and resets modulo-9 counter 25 to zero. Gate 19 is thereby opened, and pulses produced at a high repetition rate by pulse generator 18 are additively counted by tens counter 11 and units counter 22. When the count accumulated in units counter 22 reaches the lane occupancy count presently stored in storage means 10, comparator 23 produces an output pulse which is counted by modulo-9 counter 25. In addition, the latter pulse resets units counter 22, which again is rapidly driven back up to the count equal to that stored in storage means 10. Again comparator 23 produces an output pulse which is counted by modulo-9 counter 25 and also resets units counter 22. This recycling of units counter 22, which occurs at an extremely rapid rate, continues until the ninth output pulse is produced by comparators 23. This ninth output pulse again resets units counter 22, and upon being counted by modulo-9 counter 25, causes production of a single output pulse therefrom. The latter output pulse resets flip-flop circuit 27, closing gate 19, and simultaneously erases the lane occupancy count stored in storage means 10. In addition, after a delay introduced by delay circuit 28, gate 12 is open, permitting the total count accumulated in tens counter 11 to be transferred into storage means 10. This count can be seen to represent nine times the previous lane occupancy count into storage means 10. This count can be seen to the entire previous interval demarcated by interval timer 26. After a subsequent delay introduced by delay circuit 29, the delayed output pulse produced by modulo-9 counter 25 resets tens counter 11, and the next timing interval begins. It should be noted that delay circuits 28 and 29 each introduce but a brief delay, having a total duration considerably shorter than the period of pulse generator 14.

FIG. 2 illustrates a modification which may be made to the system of FIG. 1 in order to provide updated averaging of volume data. In this modification, a pulse-producing circuit 31 is substituted for lane occupancy generating circuit 30 in FIG. 1. Pulse-producing circuit 31 comprises a capacitor 40 connected between ground and the heel of a contact 41 driven by a vehicle detector 42. Positive potential is supplied to back contact 41 of detector 42, while front contact 41 is connected to input lead 17 of tens counter 11, shown in FIG. 1. The remaining portion of the system is identical to that shown in FIG. 1.

In operation, each time vehicle detector 42 is actuated, indicating presence of a vehicle, a single pulse is produced on lead 17 due to discharge of charged capacitor 40. In this fashion, at the end of a single interval demarcated by interval timer 26, tens counter 11 registers the number of vehicles detected during this interval.

Moreover, at the end of this interval, the volume reading stored in traffic parameter storage means 10, which represents an average of volume measured during previous intervals, is multiplied by 9 in a manner identical to that described for the system of FIG. 1, and this value is applied to input lead 20 of tens counter 11. Thus, the number stored in tens counter 11 just prior to opening of gate 12 represents the average volume (which formerly was stored in storage means 10) multiplied by nine, plus the number of vehicles detected during the just-completed interval. It should be noted that the term "volume" as used herein is defined in terms of number of vehicles per timer interval.

The system herein described always retains an average of previously-measured traffic data and only modifies a relatively large percentage of this average with a relatively small percentage of the newly-measured data at the end of each interval. Therefore, under stable traffic conditions the system theoretically never provides an output truly representing these stable conditions, but only approaches asymptotically with time the value of the parameter representing these conditions. However, completion of each interval brings the stored value 10% closer to the actual stable conditions from the value retained in storage during the previous interval. After but a few intervals have elapsed, the system provides a substantially accurate indication of existing traffic conditions. Thus, the system may be classified as being slightly overdamped, which makes for gradual correction in indicated traffic conditions even when an abrupt change in these conditions is sensed. This gradual correction is sighly advantageous in avoiding sudden changes in traffic signal operation, which would only serve to further disrupt traffic, by permitting smooth and gradual correction is highly advantageous in avoiding sudden changes in traffic signal operation, which would only cope with the changed traffic conditions.

For yet slower rates of correction, it is possible to substitute for modulo-9 counter 25 a counter for a number system having a different modulus. For example, a modulo-19 counter would provide correction at the rate of 5% for each timer interval, instead of 10% as accomplished by the system shown in FIG. 1. However, to divide the count by 20 prior to transfer into storage, counter 11 would necessarily have to be a twenties counter. Similarly, for faster rates of correction, a counter for a number system having a lower modulus would be preferable as a substitute for modulo-9 counter 25. For example, a modulo-4 counter would provide correction at the rate of 20% for each interval. However, to divide the count by 5 prior to transfer into storage, counter 11 would necessarily have to be a fives counter.

Thus, there has been shown apparatus for computing a running average of traffic parameters such as lane occupancy or volume on an updated basis. The system is highly versatile in that the rate at which correction is made may be easily changed. Moreover, output indications are provided in discrete steps, facilitating adaptation of the system to use with digital computers.

Although but several embodiments of the invention have been described, it is to be specifically understood that these forms are slected to facilitate in disclosure of the invention rather than to limit the number of forms which it may assume; various modifications and adaptations may be applied to the specific forms shown to meet requirements of practice, without in any manner departing from the spirit or scope of the invention.

What is claimed is:

1. Means for updating a running average of a measured traffic parameter upon completion of each interval in a succession of uniform intervals comprising, vehicle detector means, accumulator means responsive to said vehicle detector means for storing a digital indication of the parameter as measured during each separate interval, storage means for storing a digital indication of an average value of said parameter, gating means coupling the output of said accumulator means to the input of said storage means for transferring data from said accumulator means into said storage means upon completion of each separate interval, and multiplier means responsive to said storage means for additively supplying a multiple of the indication in said storage means to the input of said accumulator means.

2. Means for maintaining a running average of measured lane occupancy on a periodically updated basis comprising, vehicle presence detector means, accumulator means responsive to said vehicle presence detector means for storing a digital indication of presently-measured lane occupancy, storage means for storing a digital indication of average lane occupancy, gating means coupling the output of said accumulator means to the input of said storage means for periodically transferring data from said accumulator means into said storage means, and multiplier means responsive to said storage means for additively supplying a multiple of the indication in said storage means to the input of said accumulator means.

3. The means for maintaining a running average of measured lane occupancy on a periodically updated basis of claim 1 wherein said multiplier means comprises comparator means having a pair of inputs, pulse generating means, means coupling said pulse generating means jointly to a first input of said comparator means and to the input of said accumulator means for additively providing said multiple thereto, means coupling the output of said storage means to the second input of said comparator means, modulus counter means responsive to said comparator means for providing an output pulse upon registering a count of one less than said multiple, circuit means coupling the output of said modulus counter means to said pulse generating means for controlling operation thereof, and delay circuit means coupling the output of said modulus counter means to said gating means for controlling operation thereof.

4. Means for providing a running average of measured lane occupancy on a periodically updated basis comprising, vehicle presence detector means, pulse generator means, summation counter means for counting groups of a predetermined number of applied pulses, switching means responsive to said presence detector means for coupling said pulse generator means to said counter means, means for storing a digital indication of average lane occupancy, means coupling the output of said counter means to the input of said storing means, means responsive to said storing means for periodically multiplying the digital indication in said storing means by a multiple of one less than said number, and means coupling the output of said multiplying means to said counter means.

5. Means for providing a running average of measured lane occupancy on a periodically updated basis comprising, vehicle presence detector means, first and second pulse generator means, summation counting means for counting groups of a predetermined number of applied pulses, switching means responsive to said presence detector means for coupling said first pulse generator means to one input of said summation counting means, comparator means having a pair of inputs, gating means coupling said second pulse generator means jointly to one input of said comparator means and to a second input of said summation counting means, means for storing a digital indication of average lane occupancy, means coupling the output of said summation counting means to the input of said storing means, means coupling the output of said storing means to the other input of said comparator means, and second counting means responsive to the output of said comparator means for controlling transfer of data from said first counting means to said storing means.

6. Means for providing a running average of measured traffic volume on a periodically updated basis comprising, vehicle detector means, switching means responsive to said detector means for providing a single output pulse upon each actuation of said detector means, summation counter means for counting groups of a predetermined number of applied pulses, means coupling said switching means to the input of said counter means, means for storing a digital indication of average traffic volume, means coupling the output of said counter means to the input of said storing means, means responsive to said storing means for periodically multiplying the digital indication in said storing means by a multiple of one less than said number, and means coupling the output of said multiplying means to the input of said counter means.

7. Means for providing a running average of measured traffic volume on a periodically updated basis comprising, vehicle detector means, first pulse generator means responsive to said detector means for providing a single output pulse for each detected vehicle, second pulse generator means, summation counting means for counting groups of a predetermined number of applied pulses, means coupling said first pulse generator means to one input of said summation counting means, comparator means having a pair of inputs, gating means coupling said second pulse generator means jointly to one input of said comparator means and to the input of said summation counting means, means for storing a digital indication of average traffic volume, means coupling the output of said summation counting means to the input of said storing means, means coupling the output of said storing means to the other input of said comparator means, and second counting means responsive to the output of said comparator means for controlling transfer of data from said first counting means to said storing means.

8. Means for generating a periodically updated running average of a measured traffic parameter per time interval for a predetermined number of time intervals comprising, storage means for storing a digital indication of the value of said parameter, vehicle detector means for generating a number of pulses in response to traffic conditions, accumulator means responsive to the pulses of said vehicle detector means for accumulating the number of input pulses divided by the predetermined number of time intervals, means governed by the digital storage of said storage means for once during each interval supplying additional input pulses to said accumulator means, the number of additional pulses being the digital number of the storage means multiplied by one less than the number of intervals, and gating means for periodically replacing the digital indication in said storage means with the accumulated sum in said accumulator means.

References Cited

UNITED STATES PATENTS

| | | | |
|---|---|---|---|
| 3,082,949 | 3/1963 | Barker | 235—150.24 |
| 3,185,959 | 5/1965 | Barker | 340—38 |
| 3,199,074 | 8/1965 | Hales et al. | 340—38 |
| 3,237,154 | 2/1966 | Barker | 340—38 |
| 3,239,805 | 3/1966 | Brockett | 340—31 |

MALCOLM A. MORRISON, *Primary Examiner.*

MARTIN P. HARTMAN, *Assistant Examiner.*